United States Patent [19]
Klein

[11] Patent Number: 6,055,938
[45] Date of Patent: May 2, 2000

[54] ANIMAL GROOMING APPARATUS

[75] Inventor: Michael B. Klein, Northport, N.Y.

[73] Assignee: Ellen S. Klein, Northport, N.Y.

[21] Appl. No.: 09/258,570

[22] Filed: Feb. 26, 1999

[51] Int. Cl.[7] .............................. A01K 13/00; A47L 9/06
[52] U.S. Cl. .......................................... 119/627; 119/606
[58] Field of Search ..................... 119/606, 608, 119/609, 627, 632; 132/119.1; 15/402, 396, 323

[56] References Cited

U.S. PATENT DOCUMENTS

| | | | |
|---|---|---|---|
| 2,780,829 | 2/1957 | Cohen | 15/402 |
| 3,308,500 | 3/1967 | Woodruff | 119/606 |
| 3,574,885 | 4/1971 | Jones | 119/632 |
| 3,955,238 | 5/1976 | Remijas | 15/402 |
| 4,190,924 | 3/1980 | Nicholson | 15/402 |
| 5,067,044 | 11/1991 | Parker | 119/606 |
| 5,067,444 | 11/1991 | Parker | 119/606 |
| 5,095,853 | 3/1992 | Kruger | 119/606 |
| 5,211,131 | 5/1993 | Plyler | 119/606 |
| 5,435,327 | 7/1995 | Ho | 119/606 |
| 5,768,747 | 6/1998 | Smith | 15/402 |

*Primary Examiner*—Robert P. Swiatek
*Assistant Examiner*—Elizabeth Shaw
*Attorney, Agent, or Firm*—Scully, Scott Murphy & Presser

[57] ABSTRACT

An animal grooming apparatus for grooming an animal having a conduit for supplying a vacuum to the apparatus; a grooming tool for grooming a coat of the animal; a body portion fixed to the conduit and grooming tool; and an inlet having an open end in communication with the conduit, the inlet being flexibly attached to the conduit for following contours of the animal independent of the grooming tool, whereby debris from the coat of the animal dislodged by the grooming tool are evacuated through the open end of the inlet and conduit in communication therewith. In preferred implementations of the apparatus, the grooming tool is a curry comb and isolation hoods are provided to contain the debris within the apparatus. In a alternative embodiment, an air flow is supplied to the animal's coat instead of a vacuum.

20 Claims, 4 Drawing Sheets

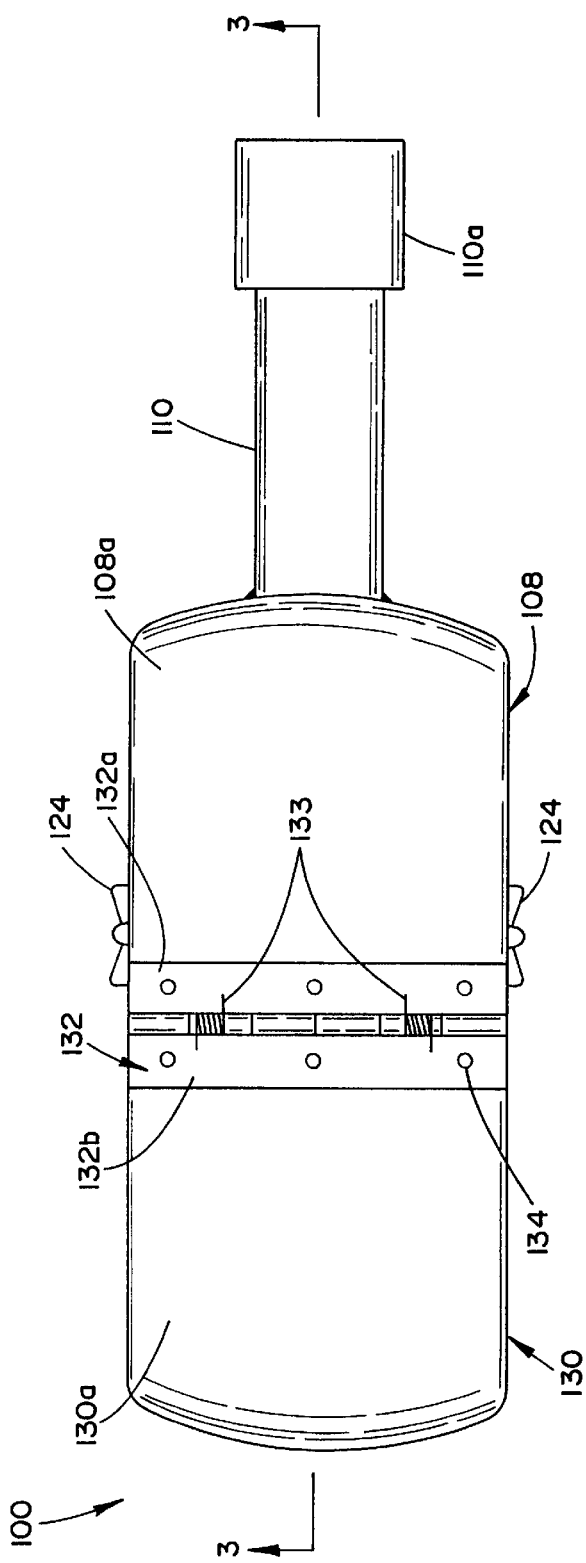
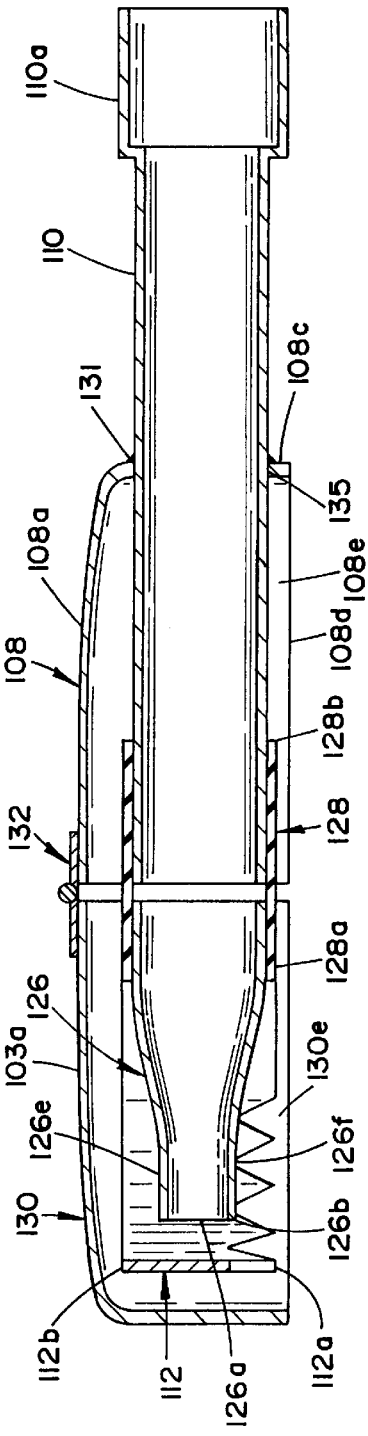
FIG. 1
FIG. 3

ANIMAL GROOMING APPARATUS

BACKGROUND OF THE INVENTION

1. Field of the Invention

The field of art to which this invention relates is an animal grooming apparatus, in particular, to an animal grooming apparatus adaptable to various grooming tools which does not contaminate the surrounding environment of hair, dander, insects, and other airborne infestations (collectively referred to as debris) removed from the animal during the grooming process.

2. Description of the Related Art

The hair on cats and dogs go through growth and resting cycles (anagen and telogen phases, respectively) that occurs asynchronously (each follicle cycles independently) and continuously in the majority of breeds. There are similar processes in humans. The average human sheds about one hundred hairs daily. Medium to large dogs of the herding, working, or retrieving breeds can shed over 2000 hairs daily. Additionally, there is a more massive shedding twice annually related to seasonal cycles to produce a hair barrier appropriate for hot or cold environments. This seasonal shed occurs in a synchronous manner for several weeks.

One can hardly imagine the consequences of infrequent grooming of such animals whereby the homes of the pet owner soon become inundated with hair, dander, and surface debris. These elements deposit from floor to ceiling, sparing no crack or crevice, by way of air currents related to household vertical temperature gradients and drafts produced by ventilation systems or open doors and windows. Owners of such pets verify the increase in health-related problems, cleaning costs, filter replacements in forced air systems and the virtually impossibility of maintaining a home free of these elements. The only practical solution is to remove this debris from the 4–6 square foot surface of the pet's coat, before its deposition over the sixteen thousand cubic feet of the average two thousand square foot home.

Numerous hand held grooming devices, including rubber and metal curry combs or metal and plastic brushes and combs can effectively remove hair that is approaching the shed cycle as well as dander and surface debris. Additionally, fine tooth metal combs and metal saw-tooth curry combs can remove fleas and their larvae and eggs as well as deer ticks (responsible for Lyme disease) and the larger wood ticks (which may harbor the Rocky Mountain Spotted Fever organism). Understandably, the grooming process must be performed outdoors, in that the "harvest" from a typical German Shepard, ungroomed for only a month, sheds enough hair to weave into a ball of yarn. Grooming on at least a thrice-weekly schedule is mandatory to achieve the desired sanitary results. While the above grooming devices are effective, they present significant problems for the homeowner and professional groomer as well. Because they provide no method of isolating the "harvest" of the above debris, there exists the possible contamination of the groomer, the environment the animal uses for exercise, and finally, the transfer of these disease causing organisms from the groomer's clothing back into the home. Uncomfortable weather conditions and shortened daylight hours can diminish the required grooming frequency. Additional problems confront professional groomers, as they are required to service animals that may harbor fleas, their larvae and eggs as well as possible tick infestation. Without isolation of the groomed elements the groomer's health as well as the health of the animals within the salon is potentially at risk.

As a remedy to these problems, various devices have been developed and patented to permit the collection of the above elements by incorporating a grooming device attached to a vacuum source. None of these devices effectively allow grooming in a home or grooming parlor in which the debris from the coat of the animal being groomed is effectively contained.

What is needed is a vacuum assisted animal grooming apparatus which effectively removes loose and near telogen hair from both the outer and undercoat of an animal before they shed spontaneously, as well as dander, surface debris, and parasites, and which accomplishes this with the highest possible assurance that such elements are isolated from escaping into the environment in which the grooming is being performed.

SUMMARY OF THE INVENTION

Accordingly, a first embodiment of an animal grooming apparatus for grooming an animal is provided wherein, the animal has a body of uneven surface contours and is covered by a coat on at least a portion of its body. The first embodiment of the animal grooming apparatus comprises: a conduit for supplying a vacuum to the apparatus; a grooming tool for grooming the coat of the animal; a body portion fixed to the conduit and grooming tool; and an inlet having an open end in communication with the conduit, the inlet being flexibly attached to the conduit for following the contours of the animal independent of the grooming tool, whereby debris from the coat of the animal dislodged by the grooming tool is evacuated through the open end of the inlet and conduit in communication therewith.

In a preferred implementation of the animal grooming apparatus of the present invention the grooming tool is a curry comb; the body portion is a first isolation hood having at least one open face for supplying air to be evacuated through the conduit and for containing the debris from the coat of the animal dislodged by the grooming tool; and further comprises a second isolation hood for further containing the debris from the coat of the animal dislodged by the grooming tool. The second isolation hood being flexibly attached to the body portion such that it follows the contours of the animal independent of both the body portion and the inlet.

A second embodiment of the animal grooming apparatus of the present invention is also provided. The second embodiment of the animal grooming apparatus comprises: a conduit for supplying an air flow to the apparatus; a grooming tool for grooming a portion of the coat of the animal; a body portion fixed to the conduit and grooming tool; and an air outlet having an open end in communication with the conduit, the air outlet being flexibly attached to the conduit for following the contours of the animal independent of the grooming tool and for directing the air flow at the portion of the coat being groomed by the grooming tool.

BRIEF DESCRIPTION OF THE DRAWINGS

These and other features, aspects, and advantages of the apparatus of the present invention will become better understood with regard to the following description, appended claims, and accompanying drawings where:

FIG. 1 illustrates a top view of a preferred implementation of the embodiments of the animal grooming apparatus of the present invention.

FIG. 3 illustrates a sectional view of the apparatus of FIG. 1 as taken along line 3—3.

DETAILED DESCRIPTION OF THE PREFERRED EMBODIMENTS

Figure 2:
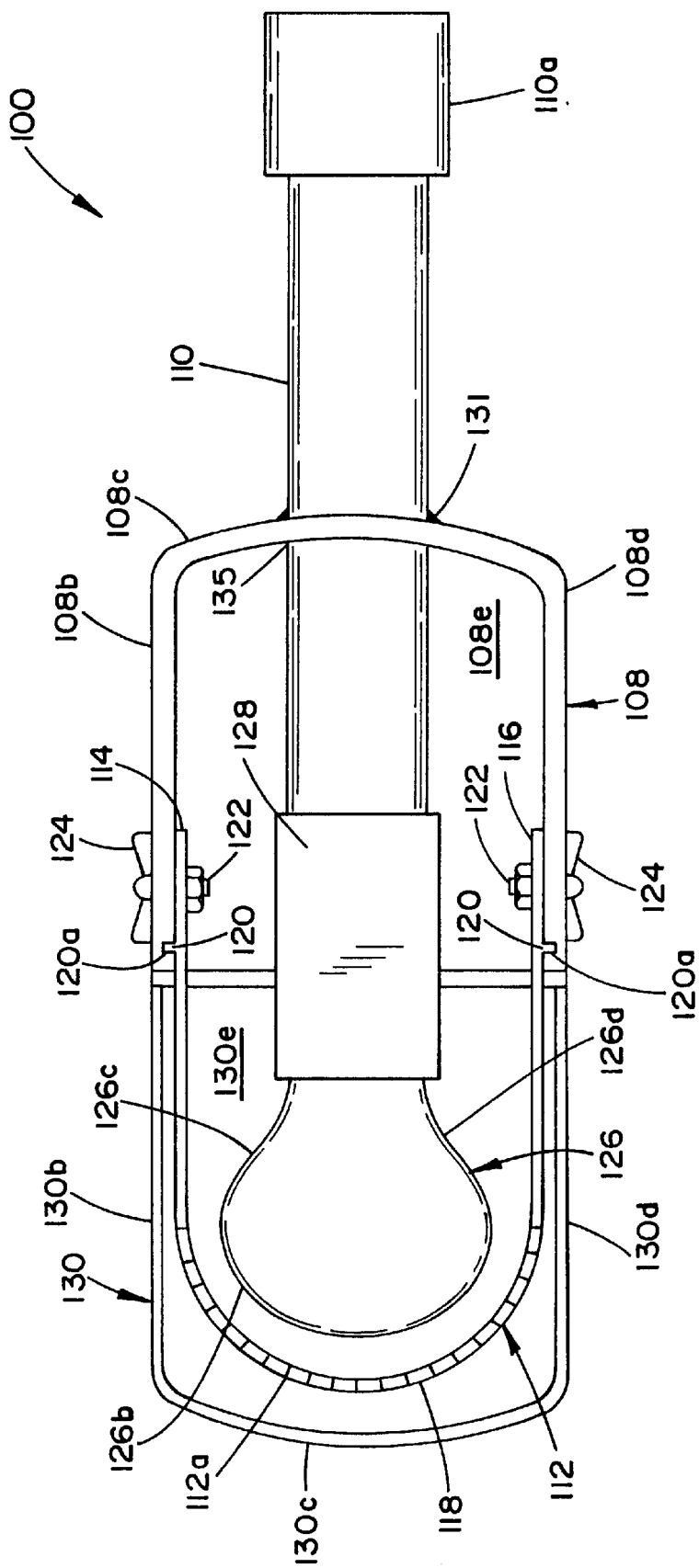
FIG. 2 illustrates a bottom view of the apparatus of FIG. 1.

Referring now in detail to FIGS. 1–3 and 5, there is illustrated a preferred implementation of the animal grooming apparatus of the present invention, generally referred to by reference numeral 100. The animal grooming apparatus 100 is for grooming a coat 102 of an animal 104. The animal 104 is typically a dog or cat having a body 106 of uneven surface contours and covered by the coat 102 on at least a portion of its body 106.

The animal grooming apparatus 100 has a body portion, preferably a first (or proximal) isolation hood 108. The first isolation hood 108 has a top surface 108a with side portions 108b, 108c, 108d on three sides forming an open face 108e. A conduit 110 fixed to the first isolation hood 108 supplies a vacuum to the apparatus 100. The conduit 110 is preferably a rigid tube having an adapter portion 110a for adapting to a vacuum cleaner hose (not shown). The conduit 110 preferably also comprises a handle for holding the apparatus 100. However, a handle can be positioned anywhere on the apparatus 100. Alternatively, the body portion, such as the first isolation hood 108 can serve as the handle.

Figure 5:
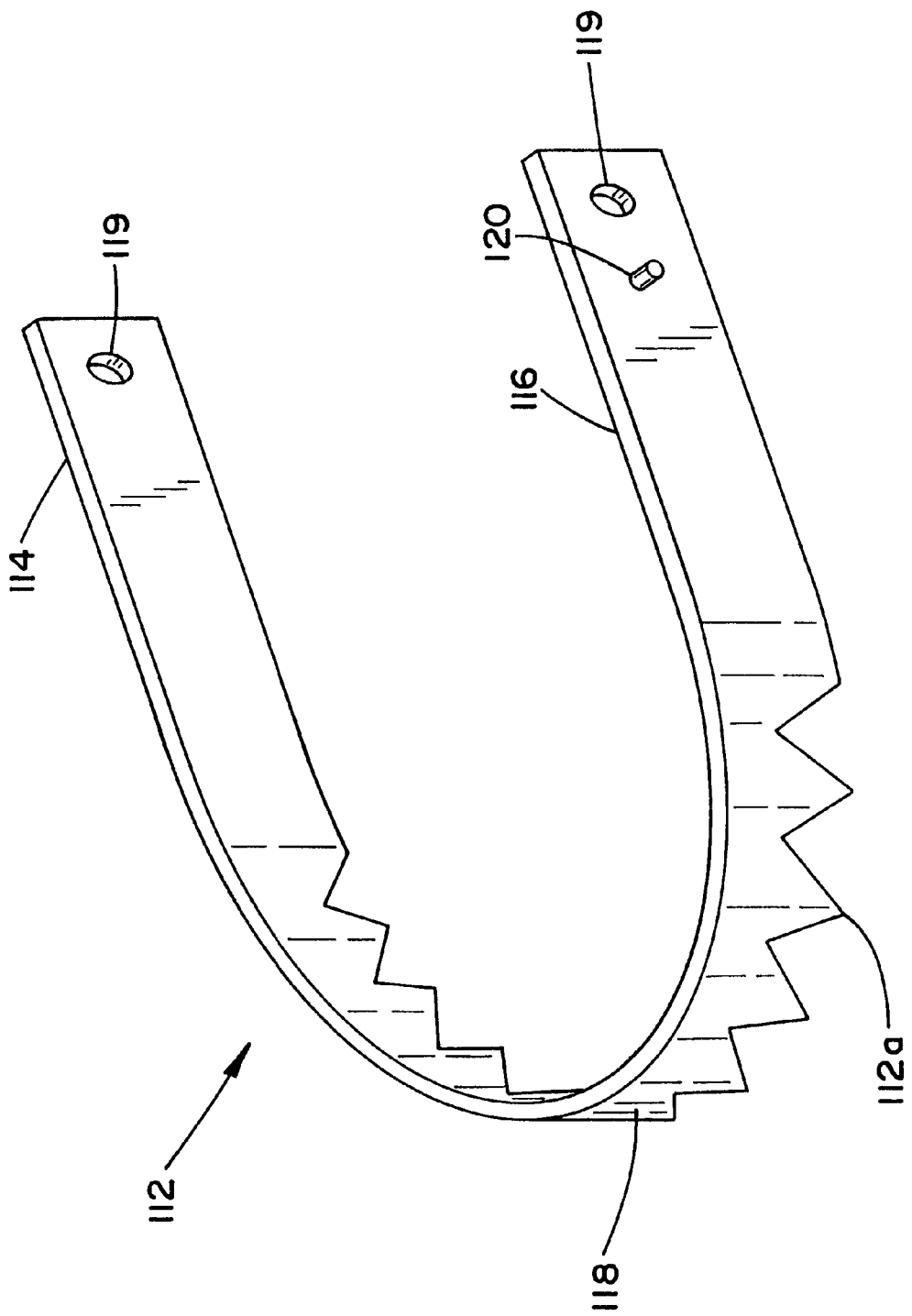
FIG. 5 illustrates an isometric view of a curry comb grooming tool for use with the apparatus of FIGS. 1–4.

A grooming tool 112 for grooming the coat 102 of the animal 104 is also fixed to the first isolation hood 108. The grooming tool 112 is selected depending upon the particular coat qualities of the animal to be groomed as well as the grooming requirements. The grooming tool 112 can be any variety of grooming combs and brushes known in the art, such as a curry comb having any one of a variety of shaped and sized teeth known in the art. The grooming tool 112 can also be a drying comb having a flat edge for short haired animals and a toothed edge for increasing the surface area to be dried in longer haired animals. A curry comb, as shown in FIG. 5, is disclosed by way of example only and not to limit the scope of the invention. Any grooming tool known in the art can be used with the animal grooming apparatus 100 without departing from the scope or spirit of the present invention.

Alternatively, the grooming tool 112 has curry teeth 112a on one edge and a flat surface 112b on another edge such that it can be fixed to the body portion with either the curry teeth 112a or the flat surface 112b in contact with the coat 102 of the animal 104. That is, the grooming tool 112 can be interchangeable between a first grooming tool on one edge and a second grooming tool on another edge.

Preferably, the grooming tool 112 has first and second ends 114, 116 and a central arcuate portion 118. The first and second ends 114, 116 are fixed to walls 108b, 108d of the first isolation hood 108, preferably by a pin 120 and screw 112 at each of the first and second ends 114, 116 to prevent rotation of the grooming tool 112 relative to the first isolation hood 108. Each screw 122 is disposed in a hole 119 in each end 114, 116 of the grooming tool 112 and a corresponding hole (not shown) in walls 108b, 108d of the first isolation hood 108. Each screw preferably mates with a wing type nut 124 which can be easily removed and replaced to easily interchange grooming tools 112. Similarly, each pin 120 is disposed in a corresponding hole 120a in walls 108b, 108d of the first isolation hood 108. In the case of a curry comb grooming tool 112, preferably only the central arcuate portion 118 has curry teeth 112a for penetrating and grooming the coat 102 of the animal 104.

The animal grooming apparatus 100 further has an inlet 126 having an open end 126a in communication with the conduit 110 and located within an area defined by the first and second ends 114, 116 and the arcuate portion 118 of the grooming tool 112. The inlet 126 is flexibly attached to the conduit 110, preferably by means of a flexible tube 128 fixed at one end 128a to the inlet 126 and at another end 128b to the conduit 110. The inlet 126 is preferably fan-shaped such that its sides 126c, 126d taper out from the conduit 110 towards the open end 126a. Additionally, faces 126e, 126f of the inlet 126 preferably taper in from the conduit 110 towards the open end 126a. The open end 126a of the inlet 126 is preferably located on a distal side 126b of the inlet 126 and intimately proximate to the arcuate portion 118 of the grooming tool 112.

The animal grooming apparatus 100 preferably has a second (or distal) isolation hood 130. The second isolation hood has a top surface 130a with side portions 130b, 130c, 130d on three sides forming an open face 130e and a cavity in which the inlet 126 and grooming tool 112 are disposed. The second isolation hood 130 is flexibly attached to the first isolation hood 108 such that it follows the contours of the animal 104 independent of both the first isolation hood 108 and the inlet 126. The second isolation hood 130 preferably flexes about a point directly above the point the inlet 126 flexes about the conduit 110. The flexible attachment is preferably accomplished by means of at least one hinge 132 fixed at one end 132a to the first isolation hood 108 and fixed at another end 132b to the second isolation hood 130. The second isolation hood 130 is preferably biased with at least one, preferably two, torsional springs 133 towards the coat 102 of the animal 104.

The components of the animal grooming apparatus 100 are preferably constructed from a resilient material. In an industrial version the components are preferably stainless steel. In the stainless steel version, the conduit 110 is preferably welded 131 into a hole 135 located in one of the walls 108c of the first isolation hood 108. Additionally, the hinge 132 is preferably spot welded 134 at its ends 132a, 132b to their respective isolation hood 108, 130. A less expensive version, particularly suitable for domestic use of a resilient plastic, such as polypropylene is also contemplated by the present invention. In the plastic version of the animal grooming apparatus 100 of the present invention, the conduit 110 and first isolation hood 108 can be integrally formed by any molding process known in the art or alternatively, the conduit 110 can be solvent or heat welded to the hole 135 in the first isolation hood 108. The hinge 132 can be fastened to the isolation hoods 108, 130 by any means known in the art such as by screws and mating nuts (not shown) or by force fitting the ends 132a, 132b of the hinge 132 into corresponding cavities (not shown) on their respective isolation hoods 108, 130.

Figure 4:
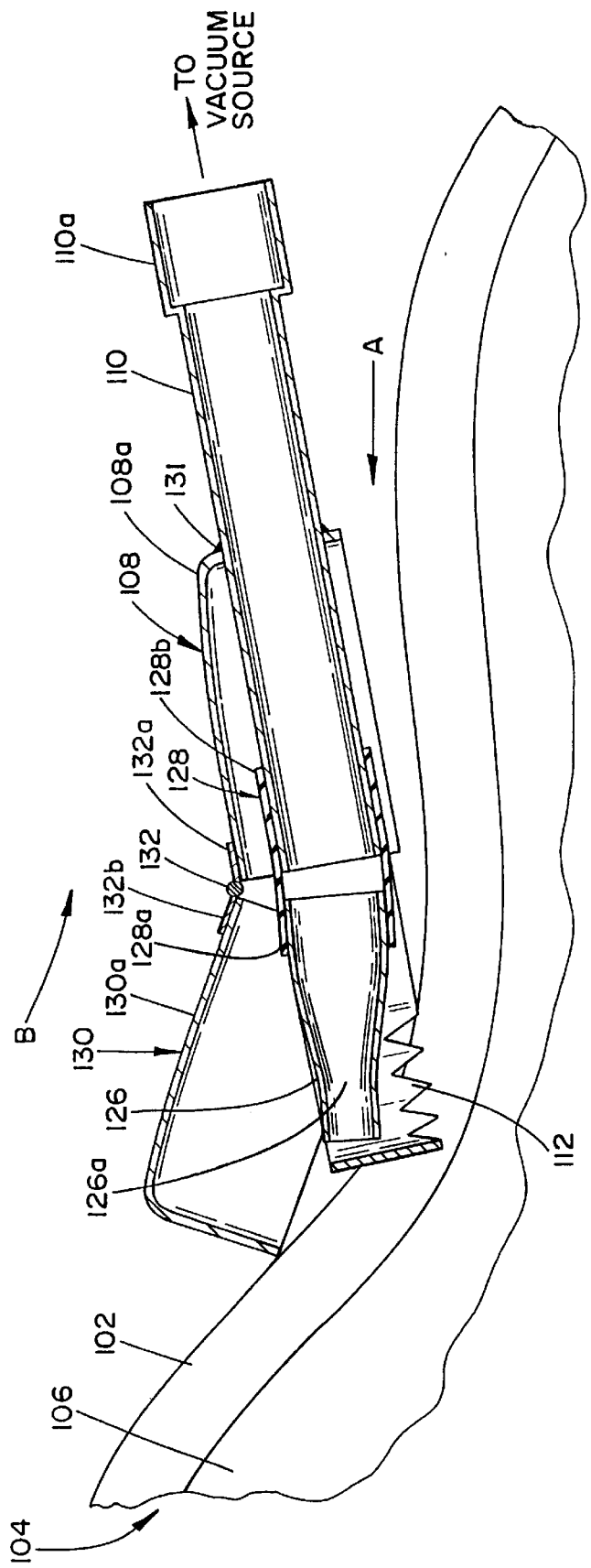
FIG. 4 illustrates the sectional view of FIG. 3 where the apparatus is in use grooming the coat of an animal.

The operation of the animal grooming apparatus 100 of the present invention will now be discussed with reference to FIG. 4. The animal grooming apparatus 100 is stroked over the coat 102 of the animal 104 such that as the first isolation hood 108 is flexed upward away from the coat 102 of the animal 104, the rigidly attached grooming tool 112 turns downward allowing the arcuate portion 118 of the grooming tool 112 to penetrate into the coat 102 of the animal 104. The second isolation hood 130 lies in contact with the coat 102 of the animal 104 and the air inlet 126 flexibly skirts over the coat 102. A vacuum source (not shown) is attached to the adapter portion 110a of the conduit 110 whereby the aspiration effect of a vacuum is applied to the apparatus 100. An air supply to be evacuated by the apparatus 100 is supplied through the raised open face 108e of the first isolation hood 108 along the direction of arrow A. For optimum grooming and air supply, the first isolation hood 108 is raised slightly from the animal surface thus creating a high velocity air flow through a narrow passageway. Once the grooming stroke is completed, the inlet 26 reassumes its neutral position behind the grooming tool 112 at which time all elements trapped within the teeth 112a of the grooming tool 112 and within the isolation hoods 108, 130 are rapidly evacuated into a containment system of the vacuum, prior to the next grooming stroke.

Thus it is evident that the inlet 126, by means of its flexible attachment 128 to the conduit 110, follows the contours of the animal 104 independent of the grooming tool 112. Debris from the coat 102 of the animal 104 dislodged by each stroke of the apparatus 100 over the coat 102 is evacuated through the open end 126a of the inlet 126 and conduit 110 in communication therewith. The open end 126a of the inlet 126 is preferably located within the confines of the grooming tool 112 and just behind the working end (e.g., the arcuate portion 118 having teeth 112a) of the grooming tool 112 in the direction (Arrow B) that the grooming tool 112 is stroked over the coat 102 such that the debris dislodged by the arcuate portion 118 of the grooming tool 112 is rapidly evacuated through the open end 126a between strokes when the inlet 126 assumes its neutral position immediately behind the grooming tool 112.

The first isolation hood 108 also acts to contain the debris from the coat 102 of the animal 104 dislodged by the grooming tool 112. The second isolation hood 130, by means of its flexible attachment 132 to the first isolation hood 108 which allows it to follow the contours of the animal's body 106 independent of both the grooming tool 112 and the inlet 126, further contains the debris from the coat 102 of the animal 104 dislodged by the grooming tool 112.

The above vacuum powered procedure is adaptable to a first stage of drying a wet animal wherein water is removed from the animal's wet coat by the grooming tool 112 and is rapidly evacuated by the concentrated suctional force of the inlet 126 intimately located behind the grooming tool 112 which now functions as what is commonly called a shedding blade. As a final drying operation, the apparatus 100 can alternatively be used to supply an air flow, preferably a warm air flow, via the conduit 110 and inlet 126 (now functioning as an outlet) which directs the air flow at the portion of the coat 102 being groomed by the grooming tool 112.

From the foregoing, it becomes readily apparent to one skilled in the art that the novel animal grooming apparatus of the present invention offers increased efficiency and convenience over currently employed devices. Due to the inventive animal grooming apparatus arrangement, the following advantages are apparent:

(a) it effectively removes loose and near telogen hair from both the outer and undercoat before they shed spontaneously, as well as dander, surface debris, and parasites;

(b) it removes hair and other debris with the highest possible assurance that such hair and debris are isolated from escaping into the environment in which the grooming is being performed;

(c) it effectively delivers the hair and other debris to a containment apparatus (i.e., a vacuum container) from which there is no escape and in which organisms can be killed without the use of toxic pesticides, which are potentially carcinogenic to humans and often lethal to cats and aquatic species;

(d) it functions both to remove loose hair and other debris from an animal prior to bathing and to dry the animal's coat subsequent to the bathing;

(e) it readily employs a broad spectrum of curry devices, combs, and brush configurations, thereby fulfilling the necessary applications of the grooming process upon animals with varying hair qualities characteristic for their breed; and (f) it effectively utilizes the suction strength of commonly available vacuum sources (preferably the wet/dry shop configuration) whereby the hair and other debris are readily suctioned off of the various grooming elements without the need for manual intervention.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

I claim:

1. An animal grooming apparatus for grooming an animal, the animal having a body of uneven surface contours and covered by a coat on at least a portion of the body, the animal grooming apparatus comprising:

a conduit for supplying a vacuum to the apparatus;

a grooming tool for grooming the coat of the animal;

a body portion fixed to the conduit and grooming tool; and an inlet having an open end in communication with the conduit, the inlet being flexibly attached to the conduit for following the contours of the animal independent of the grooming tool, whereby debris from the coat of the animal dislodged by the grooming tool are evacuated through the open end of the inlet and conduit in communication therewith.

2. The animal grooming apparatus of claim 1, further comprising a handle fixed to the body portion.

3. The animal grooming apparatus of claim 2, wherein the conduit also acts as the handle.

4. The animal grooming apparatus of claim 1, wherein the grooming tool is a curry comb.

5. The animal grooming apparatus of claim 1, wherein the grooming tool is a drying comb.

6. The animal grooming apparatus of claim 1, wherein the grooming tool has curry teeth on one edge and a flat surface on another edge such that it can be fixed to the body portion with either the curry teeth or the flat surface in contact with the coat of the animal.

7. The animal grooming apparatus of claim 1, wherein the grooming tool has first and second ends and a central arcuate portion, the first and second ends being fixed to the body portion.

8. The animal grooming apparatus of claim 7, wherein the central arcuate portion has curry teeth for penetrating and grooming the coat of the animal.

9. The animal grooming apparatus of claim 7, wherein the inlet has two faces and two sides, the faces taper in from the conduit toward s the open end and the sides taper out from the conduit towards the open end, wherein the open end is located on a distal side of the inlet and proximate to the arcuate portion of the grooming tool such that the debris dislodged by the arcuate portion of the grooming tool is immediately evacuated through the open end.

10. The animal grooming apparatus of claim 9, wherein the inlet is located within an area defined by the first and second ends and the arcuate portion of the grooming tool.

11. The animal grooming apparatus of claim 1, wherein the body portion is a first isolation hood having at least one open face for supplying air to be evacuated through the conduit and for containing the debris from the coat of the animal dislodged by the grooming tool.

12. The animal grooming apparatus of claim 11, wherein the grooming tool is fixed to the first isolation hood by a pin and screw at each of two ends of the grooming tool such that the grooming tool is prevented from rotation relative to the first isolation hood.

13. The animal grooming apparatus of claim 1, further comprising a second isolation hood for containing the debris from the coat of the animal dislodged by the grooming tool, the second isolation hood being flexibly attached to the body portion such that it follows the contours of the animal independent of both the body portion and the inlet.

14. The animal grooming apparatus of claim 13, wherein the second isolation hood is flexibly attached to the body portion by way of at least one hinge.

15. The animal grooming apparatus of claim 13, further comprising a biasing means for biasing the second isolation hood towards the body of the animal.

16. The animal grooming apparatus of claim 15, wherein the biasing means comprises at least one torsional spring disposed at the point of flexible attachment to the body portion.

17. The animal grooming apparatus of claim 1, wherein the inlet is flexibly attached to the conduit by way of a flexible tube fixed at one end to the inlet and at another end to the conduit.

18. The animal grooming apparatus of claim 1, wherein the conduit further has an adapter portion for adapting to a vacuum cleaner hose.

19. An animal grooming apparatus for grooming an animal, the animal having a body of uneven surface contours and covered by a coat on at least a portion of the body, the animal grooming apparatus comprising:

a conduit for supplying an air flow to the apparatus;

a grooming tool for grooming a portion of the coat of the animal;

a body portion fixed to the conduit and grooming tool; and an air outlet having an open end in communication with the conduit, the air outlet being flexibly attached to the conduit for following the contours of the animal independent of the grooming tool and for directing the air flow at the portion of the coat being groomed by the grooming tool.

20. The animal grooming apparatus of claim 19, further comprising an isolation hood for containing debris from the coat of the animal dislodged by the grooming tool, the isolation hood being flexibly attached to the body portion such that it follows the contours of the animal independent of both the body portion and the air outlet.

* * * * *